US011684008B2

(12) United States Patent
Niehues et al.

(10) Patent No.: US 11,684,008 B2
(45) Date of Patent: Jun. 27, 2023

(54) ROOT CROP HARVESTER

(71) Applicant: Grimme Landmaschinenfabrik GmbH & Co. KG, Damme (DE)

(72) Inventors: Christoph Niehues, Lohne (DE); Alfons Pöhlking, Steinfeld (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 982 days.

(21) Appl. No.: 16/341,458

(22) PCT Filed: Oct. 16, 2017

(86) PCT No.: PCT/EP2017/076371
§ 371 (c)(1),
(2) Date: Apr. 12, 2019

(87) PCT Pub. No.: WO2018/069551
PCT Pub. Date: Apr. 19, 2018

(65) Prior Publication Data
US 2020/0000022 A1    Jan. 2, 2020

(30) Foreign Application Priority Data
Oct. 14, 2016 (DE) .................... 10 2016 012 245.5

(51) Int. Cl.
*A01D 33/08* (2006.01)
*A01D 17/10* (2006.01)

(52) U.S. Cl.
CPC ........... *A01D 17/101* (2013.01); *A01D 33/08* (2013.01)

(58) Field of Classification Search
CPC ........ A01D 33/02; A01D 33/04; A01D 33/08; A01D 17/101; A01D 2017/103; A01D 2017/106; A01D 2017/108
See application file for complete search history.

(56) References Cited

U.S. PATENT DOCUMENTS

| 676,188 A | 6/1901 | Higdon |
| 1,753,874 A | 4/1930 | Taylor |
| (Continued) | | |

FOREIGN PATENT DOCUMENTS

| CN | 185 98 39 | 11/2006 |
| CN | 203 289 890 | 11/2013 |
| (Continued) | | |

OTHER PUBLICATIONS

English Translation of DE 10 2007 034 446 A1; Inv: Kalverkamp; Pub. Date: 1/20090 (Year: 2009).*

(Continued)

*Primary Examiner* — Joseph C Rodriguez
(74) *Attorney, Agent, or Firm* — Gudrun E. Huckett (57) ABSTRACT

The invention relates to a root crop harvester in the form of a potato harvester (1), comprising a lifting device (2), from which a crop material (E) and also a mixture (G) comprising clods, weeds and similar admixtures (B) can be displaced in the region of screen belts (3) which are arranged downstream thereof. According to the invention, the mixture (G) lying on one of the feed belts (4) reaches a sorting zone, where the crop material (E) is sorted by means of a separating device (6) that is arranged above the feed belt (4) and is acting on the mixture (G) transversely to the direction of feed of the feed belt, in such a manner that two scraper belts (8, 9), which are circulating in the same direction in a scraping direction (7, 7'), capture the crop material (E) by means of respective scraper elements (10, 10; 11, 11'), and feed said crop material in two adjacently arranged scraping planes (12, 13) to a sorting belt (14) that is arranged downstream thereof. Admixtures (B) that remain on the feed belt (4) can be discharged in a discharge direction (5'), which is preferably offset by about 90° from the scraping direction (7, 7'), wherein the two scraper belts (8', 9') are in each case (Continued)

individually adjustable in the region of at least one of the supporting devices (17, 18) which hold in each case said scraper belts.

15 Claims, 10 Drawing Sheets

(56) References Cited

U.S. PATENT DOCUMENTS

| | | | |
|---|---|---|---|
| 2,277,450 A | | 3/1942 | Pam |
| 2,657,798 A | | 11/1953 | Young |
| 2,698,506 A | | 1/1955 | Rushfeldt |
| 2,718,110 A | | 9/1955 | Butler |
| 2,827,241 A | | 3/1958 | Downs |
| 2,828,012 A | * | 3/1958 | Komuchar ............ A01D 33/04 460/61 |
| 3,198,259 A | | 8/1965 | Manuel |
| 3,211,288 A | * | 10/1965 | Peis ................. A01D 33/04 209/616 |
| 3,583,564 A | * | 6/1971 | Peters ............... A01D 33/04 209/616 |
| 4,284,145 A | | 8/1981 | Small et al. |
| 5,085,279 A | * | 2/1992 | Kvistgaard ........... A01D 33/12 171/131 |
| 9,439,346 B2 | | 9/2016 | Kalverkamp |
| 2004/0148919 A1 | | 8/2004 | Dunn |
| 2008/0017394 A1 | | 1/2008 | Kalverkamp |
| 2015/0321225 A1 | | 11/2015 | Dettmer et al. |
| 2016/0113192 A1 | | 4/2016 | Dettmer et al. |
| 2016/0113193 A1 | | 4/2016 | Dettmer et al. |

FOREIGN PATENT DOCUMENTS

| | | | |
|---|---|---|---|
| CN | 204 377 412 | 6/2015 | |
| CN | 105 123 081 | 12/2015 | |
| CN | 105 638 066 | 6/2016 | |
| CN | 105 684 627 | 6/2016 | |
| DE | 28 1 2 211 | 9/1979 | |
| DE | 93 29 575.9 | 10/1994 | |
| DE | 195 24 145 | 1/1997 | |
| DE | 202 06 240 | 9/2002 | |
| DE | 20 2007 018 518 | 10/2008 | |
| DE | 10 2007 034 446 | 1/2009 | |
| DE | 20 2013 1 02 558 | 12/2013 | |
| DE | 102016012245 A1 * | 4/2018 | ............ A01D 17/10 |
| GB | 2016957 | 9/1979 | |

OTHER PUBLICATIONS

Grimme Landmaschinenfabrik GMBH & Co. KG: Company Brochure SE150/170-60 01/08/4000 "2-reihige, seitengezogene Kartoffelerntemaschine mit Großbunker" and corresponding English language broschure (2-row, offset-trailed potato harvester with large bunker); 2008.

* cited by examiner

ROOT CROP HARVESTER

BACKGROUND OF THE INVENTION

The invention concerns a root crop harvester in the form of a potato harvesting machine which is provided with a lifting device from where a mixture comprising the crop as well as clods, haulm and similar admixtures is moveable into the region of downstream screening belts, whereby the mixture lying on one of the feed belts reaches a sorting zone and in this sorting zone, by means of a separating device arranged above the feed belt and acting transversely to the feed direction of the latter on the mixture, the crop can be sorted out in such a way that two strip belts, circulating in the same direction in a stripping direction, engage the crop by means of respective stripper elements, supply it in two adjacently arranged stripper planes to a downstream sorting belt and, in this context, respective admixtures remaining as residue on the feed belt can be discharged in a guiding direction which is preferably displaced by 90° relative to the stripping direction.

Potato harvesting machines have been used for a long time in the form of so-called complete harvesters wherein self-propelled and pulled embodiments of complete harvesters are known. In a pulled machine according to DE 93 20 575.9 U1, a mixture of crop and clods picked up from the field by a lifting device is transferred across several screen conveyors to an upper rock separating device. Here, further transport of the crop to a picking belt is controlled by means of a finger belt or rotating brushes.

In a solution according to DE 195 24 145 A1, a similar rock and clod separating device is also integrated into the system so that the crop forms a stream that is substantially free of any admixtures. In a proposal according to DE 20 2013 102 558 U1, a multi-layer system is used in the region of a clod belt for mixture control and sorting of the components wherein for removal of contaminants containing a mixture respective rollers or brushes are provided.

In a potato harvesting machine (Grimme Landmaschinenfabrik GmbH & Co. KG, company brochure SE150/170/60, 01/08/4000) that has been on the market for a long time, a separating device acting on the precleaned mixture is provided in a sorting zone of the conveyor system. In the region of a stripper system embodied as a slat or rod conveyor, it comprises respective stripper elements in the form of follower fingers or hedgehog contours. In this context, at least two of these stripper systems are arranged one behind the other in the conveying direction of the feed belt so that the stripper elements form two stripper planes arranged in the same plane adjacent to each other which act one after the other above the feed belt on the supplied mixture.

Accordingly, in the sorting zone a multi-phase transverse displacement of parts of the crop is possible and the latter can be transferred correspondingly without admixtures to the sorting belt. In this context, the two stripper belts are adjustable in regard to their speed. As a result of the construction, only a common adjustment of both stripper belts is possible so that, in case of quickly changing different harvesting conditions, the proportion of admixtures inadvertently reaching the sorting belt can be disadvantageously high. A corresponding embodiment of the separating device is provided also in the construction of the potato harvesting machine according to DE 10 2007 034 446 A1 that constitutes the closest prior art.

The invention concerns the problem of providing a potato harvesting machine operating with screening belts in whose sorting zone an optimal adjustment of changing sorting parameters is possible by means of an improved separating device so that thereby one can react better to different harvesting conditions as well as soil-dependently changing mixture structures.

SUMMARY OF THE INVENTION

The invention solves this problem with a potato harvesting machine characterized in that the two stripper belts are individually adjustable in the region of at least one support device holding them, respectively. Further embodiments of the construction according to the invention result from the dependent claims.

Based on the afore described structures of known potato harvesting machines that have been discussed as prior art, it is provided in the region of at least one of its sorting zones with a separating device that acts on the crop and now, embodied according to the invention, can react by differently selectable adjusting parameters in the region of the at least two stripper belts—in the region of the at least one feed belt—to varying mixtures and/or consistencies of the conveyed stream.

Based on the two stripper belts—with adjacently arranged stripper planes—it is provided that these two stripper belts are integrated, each individually adjustable, into the system. For this purpose, they are joined, as autonomous component groups, to a transverse stripper unit which, by means of at least one support device, is provided above the feed belt acting as a mixture conveyor.

These individual adjusting possibilities in the region of the stripper belts are aimed at the respective stripper elements of the circulating stripper belts being able to assume different access positions above the feed belt. In this way, the system, which forms respective horizontal stripper planes in a working gap between the stripper belts, can be adjusted such that the mixture of tubers, rocks, and clods introduced below by the circulating feed belt is subjected to different stripping and entrainment movements. In this context, the stripper elements—on the basis of respective variable engagement angles and/or engagement depths—act advantageously on the crop such that the latter is imparted with defined conveying impulses, the transversely oriented discharge away from the mixture to the adjacently positioned sorting belt is realized, and the admixtures, substantially unaffected, are transported farther.

In this context, already a differently adjustable height position of the stripper elements above the feed belt can be used for a stepped sorting of large and not so large tubers of the crop—at the same time, the smaller, heavier clods and rocks remain on the circulating feed belt and are conveyed by it laterally to a guiding direction.

Also, it is provided that an orientation of the stripper planes of the two pairs of stripper elements which forms a "wedge-shaped" working gap—by means of its position change in relation to the "horizontal" feed plane—can also lead to the smaller as well as harder structures of clods or rocks being pressed onto the feed belt and these parts being conveyed in a targeted fashion in the guiding direction, that is in particular displaced by 90° relative to the stripping direction, farther to a waste belt or similar discharge conveyor.

It is understood that the adjustable system of the two stripper belts enables additional different adjusting variants wherein the stripper elements of the respective stripper belt, individually or in pairs, can be positioned in varying height spacings as well as angular positions relative to the feed belt of the sorting zone and, in this context, varying stripper planes are built in this belt crossing structure.

A constructively improved realization of this individual adjusting system provides that the stripper belts can also comprise a common support connection in whose region then a simultaneous adjustment or repositioning of the stripper planes formed by stripper elements is possible.

A preferred embodiment of the construction in the region of the common support device provides that the respective stripper planes of the two stripper belts can be adjusted to changeable tilting angles in their transverse direction. This results in the stripper elements present at the stripper belts in the form of fingers or bristles being also "entrained" upon change of the tilting angle of the stripper belt. In this way, the afore described conveying and transfer conditions in the region of the working gap between feed belt and stripper belts can be comparatively easily changed and the stripping conditions can be adjusted quickly to changing conveying streams.

It has been found that in the region of the sorting zone comprising the "belt crossing" a variation of the sorting conditions can be already achieved in that the stripper planes of the two stripper belts each are individually adjusted in their parallel height spacing relative to the feed belt to identical or different spacings. In this context, in particular also a "step-shaped" transition—with stripper planes at different heights—in the region of the working gap can be achieved. This results in that the sorting conditions are affected in the region of the step-like "profilings" in the region of the conveying stretch or sorting zone covered by the separating device.

Based on known embodiments of the stripper belts, the latter are preferably provided with two rows of circulating stripper elements, respectively. These two rows of finger structures are in particular displaced together upon adjustment of the respective stripper belt.

For the constructive realization of the system with individually adjustable stripper belts, different adjusting possibilities are conceivable. In this context, the optimal structure can depend in particular also on the available installation space so that the selective embodiment of, for example, servomotors or adjusting cylinders with appropriate adjusting members is conceivable. In any case, it is provided that the stripper belts in the region of the "two-part" support device each comprise at least one motor-driven adjusting device with adjusting member. With appropriate support components as connectors to the machine frame, the selective height adjustment or a change of the tilting position at the two stripper belts is enabled by means of individually introducible adjusting movements.

In preferred embodiment, the two stripper belts each are secured in a frame structure comprising lateral support plates. In their region, at least one adjusting drive in the form of a hydraulic motor or the like is provided, respectively. In this way, a lifting cylinder or similar adjusting device can move a corresponding adjusting mechanism such that the two independent adjustments of the two stripper belts can be carried out.

An advantageous embodiment of this support construction provides that the two stripper belts in the region of the central support connection interact by means of a common pivot joint. By means of a displacement that is affecting this pivot joint, the two stripper belts can be moved simultaneously into a respective tilting position extending in the same direction or opposite direction. In this context, in the region of this pivot joint, a restoring mechanism, for example, with a restoring spring, is advantageously provided so that a substantially automatic restoring movement of the two stripper belts into the start position that is parallel to the feed belt is possible.

The overall concept of the new separating device provides that the latter can be supported in the region of the two stripper belts with only three support connections relative to the machine frame. In this context, it is provided that, in particular in the region of the three adjusting devices, a three-point support by means of respective holding parts is constructed. In this way, an advantageous stable and torsion-stiff fixation of the separating device in the machine frame is achieved.

The problem defined at the beginning is solved in regard to a gentle and operationally reliable sorting for all sorting parameters and different harvesting conditions as well as soil-dependently changing mixture structures by a root crop harvester of the aforementioned kind wherein a supply from the feed belt to the sorting belt and in particular to a picking table is embodied without drop stage. Advantageous embodiments of this root crop harvester can be found in combination with the features of the additional embodiments according to the invention, afore described or described in the following, as well as the dependent claims.

A root crop harvester according to the invention is embodied as a potato harvesting machine which is provided with a lifting device from where a mixture comprising the crop as well as clods, haulm and similar admixtures is movable into the region of downstream screening belts, whereby the mixture lying on one of the feed belts reaches a sorting zone and in this sorting zone, by means of a separating device of the root crop harvester that is arranged above the feed belt and acting transversely to the feed direction of the latter on the mixture, the crop can be sorted out in such a way that two strip belts, circulating in the same direction in a stripping direction, engage the crop by means of respective stripper elements, supply it in two adjacently arranged stripper planes to a downstream sorting belt and, in this context, respective admixtures remaining as residue on the feed belt can be discharged in a guiding direction which is preferably displaced or angled by 90° relative to the stripping direction. Furthermore, a supply through the sorting zone from the feed belt to the sorting belt is designed in accordance with the invention without a drop stage. In particular, the supply to the sorting belt and farther to a picking table is designed also without a drop stage, wherein the picking table can be embodied as a part of the sorting belt or downstream thereof. Such a transfer through the sorting zone is gentle to the crop and leads to controlled conditions in the material stream, in particular when sorting the crop or the crop/admixture mixture.

A drop stage is considered to be present when the feed belt, the downstream sorting belt and/or a possibly intermediately arranged intermediate conveyor belt as well as in particular additionally a picking table belt downstream of the sorting belt are arranged partially below each other and the root crop is transferred in vertical direction, at least substantially caused by gravity and in particular in a free fall, i.e., in sections without contact in relation to the feeding and the receiving belt. Slides or guiding plates therefore would be considered a drop stage. Actively rotating transferring elements in this context are not considered a drop stage. A transfer roller connecting terminal regions of the respective belts at a slant to each other, for example, for compensation of different support element heights of hedgehog webs, therefore does not count as a drop stage in this context. The sorting belt corresponds in this context to a belt leading away from the sorting zone and transporting, at least substantially, preferably completely, only crop thereon.

Advantageously, the sorting belt and the at least one feed belt as well as in particular intermediate conveyor belts that are present constitute conveying planes which preferably form a uniform conveying plane by passing into each other and/or whose height difference perpendicular to the stripping direction, viewed in a side view, amounts to at least less than 3 cm, preferably less than 2 cm, whereby the transfer of the root crop onto the sorting belt is particularly gentle. Sorting can thus be realized in an operationally reliable way under the given circumstances and transfer onto the sorting belt enables a good fractionation of different sizes of the crop.

In this context, for example, a plane that is defined in case of hedgehog webs by their tips through which the plane extends is considered a conveying plane. A uniform conveying plane is generally provided at least when the followers or the respective root crop-transporting carrying elements (for example, of the knob web or hedgehog web) of the sorting belt and the downstream feed belt are positioned so as to extend, viewed in a plane parallel to the conveying direction, at least partially at the same height adjacent to each other. Possibly present intermediate conveying belts are also positioned preferably at the same height.

In particular, all feed and sorting belts present in the sorting zone as well as possibly present intermediate conveyor belts for the mixture or its components are provided with a conveying direction which, in plan view, is at least substantially parallel, i.e., differing by less than 10°, and is in particular parallel, while only the stripper belts with their movement direction are positioned angularly thereto. The entire sorting region can thus be constructively simpler and optionally more narrow and in particular also provided with feed belts and discharging sorting belts that make good use of the machine width. The stripper belts transfer the crop, which is further transported in the conveying direction and is to be sorted, by impulses that are applied transverse to the conveying direction in a targeted fashion in the direction toward the sorting belt while in particular rocks are stripped less strongly to the side by the stripper belts and, by further conveyance in the conveying direction, reach quickly the end region of the feed belt or of a possibly intermediately positioned intermediate conveyor belt and from there reach a discharging conveyor discharging the admixtures. The latter is arranged, in particular viewed in conveying direction, still partially behind the feed belt and can optionally also have the same conveying direction. By arrangement of feed belt and sorting belt as well as optionally present intermediate conveyor belt with identical conveying direction directly adjacent to each other, the crop can be transferred onto the sorting belt by means of the stripper belts without drop stage and thus in a gentle way. The belts are arranged directly adjacent in particular when they are spaced apart from each other by less than 3 cm, even more preferred less than 2 cm, and furthermore preferably exhibit no height difference greater than 3 cm.

An advantageous further embodiment of the invention is characterized in that at least one of the two stripper belts in the conveying direction comprises a discharge section in front of a terminal deflection in which this stripper belt, viewed transverse to the conveying direction, is provided with an incline smaller than 55° relative to the stripper plane, wherein the stripper belt comprises in sections a non-round contour and in particular constant incline. Deflections that optionally lead over to the discharge section by means of deflection rollers or other at least circular segment-shaped guiding devices are not taken into account in this context.

The incline of the stripper belts in the respective discharge section is based on the angle between the contour, or optionally a tangent to the contour in case of a curved contour, of the pulling element of the stripper belt in the discharge section and the stripper planes, viewed in a side view transverse to the conveying direction or stripping direction of the respective stripper belt.

Non-round in sections means that in a side view in the direction transverse to and in particular 90° relative to the conveying direction, the stripper belt comprises a raised or inclined course of the lower run which is not embodied in a circular arc shape and which, even before the actual deflection of the respective stripper belt, ensures a gentle and in particular speed-regulated transfer of the root crop, in particular of the potatoes, onto the sorting belt. Therefore, "non-round" does not relate to a shape that is closed across 360°.

The potatoes that are conveyed also in the direction of the end of the stripper belt in the sorting zone, are still in engagement or contact with the more or less perpendicularly extending stripper elements of the stripper belt upstream of the discharge section in which the course of the stripper belt is in particular straight. For example, the stripper elements are stripper fingers which, viewed in the stripping direction, can be positioned one behind the other and/or displaced relative to each other on a strap and/or on transverse stays of the stripper belt. By the deflection of the stripper belt at its end, the stripper fingers in the prior art are subjected to an acceleration in particular at their outermost ends that are in contact with the root crop. This affects the root crop negatively which in the prior art often leads to the root crop being accelerated and conveyed against a lateral boundary of the sorting belt or beyond the sorting belt. This accelerated transfer action is hard to control, in particular when size fractions are to be supplied separately to the sorting belt. A shorter stripper belt however has the result that the entire width of the sorting belt cannot be utilized in a targeted fashion.

Due to the further embodiment according to the invention with a discharge section, a more targeted discharge of the root crop from which clods, haulm and similar admixtures have been substantially removed is realized, and the transfer onto the processing belt is realized substantially in an operationally reliable way. In the discharge section which rises relative to the actual sorting zone, the stripper elements are more carefully retracted from the root crop so that they are increasingly less in contact with the root crop. A belt course which is defined by the actual deflection in particular beginning at an incline of 55° leads only to a minimal or no further impulse introduction into the root crop. Due to the discharge section that defines a discharge region in the sorting zone, the root crop thus reaches the sorting belt in a more operationally reliable and better speed-controlled way than is the case in the prior art.

The root crop harvester embodied as a potato harvesting machine is generally provided with a lifting device and comprises in addition downstream screening belts and feed belts which, across a supply direction, bring the mixture in a sorting zone into the region of a separating device of the root crop harvester. The separating device comprises stripper belts angled transverse to the feed direction, i.e., at an angle between 80° and 145° and thus at a slant or a right angle, and provided with respective stripper elements which separate the incoming mixture in such a way that the root crop is transferred substantially free of admixture onto the sorting belt of the root crop harvester following downstream in the stripping direction. Admixtures that remain on the feed belt or a belt which is present in the sorting zone can be discharged in a guiding direction embodied substantially parallel to the feed direction.

In longitudinal direction of the stripper belt, the spacing of the stripper elements relative to the stripper plane of the stripper belt increases across the length of the discharge section up to maximally 50%, preferably up to maximally 30%, of the length of the stripper elements. At a height of approximately 50% above the stripper plane, an engagement in the bulk of root crop, optionally already present on the sorting belt and already separated from admixtures such as clods or rocks, an engagement is substantially prevented. In this context, the vertical distance from the tip of a respective stripper element, pointing in the direction of the stripper plane, toward the stripper plane is considered the spacing.

The stripper plane of a stripper belt corresponds to the plane which extends through the lines drawn by the ends of the stripper elements acting on the mixture in the sorting zone, namely in the part of the stripper belt extending straight above the mixture in front of a possibly present discharge section. In case of stripper elements of different length, one or several further stripper planes are then defined which then are correspondingly considered for the spacing of the stripper elements of corresponding length in the discharge zone. For the purpose of the consideration before or in the following, this stripper plane continues also in the discharge section (uncurved).

In particular in discharge sections that have a constant incline and therefore rise linearly, a uniform detachment of the stripper elements from the crop occurs so that the latter is transferred in a gentle way on the sorting belt or is left thereon.

Depending on the width of the sorting belt and length or length position of the end of the stripper belt, projected onto the stripper plane, the length of the discharge section amounts to approximately 5 to 10% of the length of the stripper belt, viewed in a plan view.

For the purpose of adaptation to different harvesting conditions, to changing sorting parameters as well as to respective root crop shapes, according to an advantageous further embodiment of the invention the incline of the discharge section can be separately adjustable. For this purpose, associated deflection rollers and adjusting means can be provided between frame parts of the stripper belt, for example.

For an optimal separation and optimal distribution of the components of the supplied mixture, the lengths of the at least two stripper belts, in particular viewed in a plan view, are preferably differently long. In an advantageous embodiment of the invention, the first and leading stripper belt in the feed direction is embodied longer than the second stripper belt arranged behind it. In this way, the largest ones of the root crop to be sorted can be best conveyed across the longer stripper belt into the outermost edge area of the sorting belt positioned remote from the feed belt while smaller potatoes or root crop can be conveyed by a downstream stripper belt or a downstream row of closer to the side of the sorting belt that is closer to the feed belt.

In case of undesirable slanted positions of the root crop harvesters and thus of the feed belt, it can happen that the supplied mixture is supplied on one side and not uniformly distributed across the feed belt. For this purpose, in order to vary the maximum road width of the stripper belts which are acting in particular transverse to the travel direction or, generally, in order to better control processing of the supplied mixture and sorting of the separated crop, the stripper belts can be designed to be moveable lengthwise, individually or together and in particular also opposite to each other, in or opposite to their conveying direction. For this purpose, length adjusting devices are provided which are arranged directly at the machine frame or at another frame part, for example, of the separating device, and as a part of the support device.

Preferably, the stripper belts and in particular the support device are pivotable about a respective vertical axis in order to be able to adjust the angle between stripping direction and feed direction in regard to different sorting parameters and/or belt running speeds. The stripper belts can be embodied to be pivotable about a respective or an identical vertical axis. A vertical axis is in this context in particular an axis which is perpendicular to the stripper plane. For pivoting, pivot adjusting devices are provided which in particular are connected to the support frame or to other parts of the support device and/or the machine frame and at which the stripper belts can be correspondingly pivoted simultaneously parallel, but also differently opposite to each other.

In particular, the stripper belts are positioned relative to the feed belt at an angle between 80° and 145° so that a transfer and separation of the mixture is realized transversely in the direction toward the sorting belt or toward a discharge belt for admixtures that is preferably extending parallel thereto.

Depending on the existing installation space and quantity of the mixture to be sorted and supplied, the sorting zone can be enlarged between feed belt and sorting belt by an intermediate conveyer belt that is enlarging the sorting zone. It also forms a plane with feed belt and sorting belt. The feed belt as well as the sorting belt can be known hedgehog webs or rubber knob webs. The conveying directions of feed belt, intermediate conveyor belt, and sorting belt are preferably parallel, at least in a plan view.

In order to be able to impart, across the length of the stripper belt, different impulses to the material to be sorted, the length of the stripper elements of a stripper belt, viewed across its extension, can be different in transverse as well as in its longitudinal direction. Preferably, for individual stripper elements the length is maximally reduced to around 30% of the length of the longest element in order to have, for example, for finger-like stripper elements of a total length of 15 to 25 cm, a corresponding distribution of the impulse, acting on root crop of different size, on the root crop to be separated.

Also, the spacing in stripping direction of the stripper elements arranged one behind the other of the individual stripper belt or of stripper belts positioned one behind the other is advantageously differently sized and in particular for the stripper belt to the rear, viewed in the feed direction, smaller than for the leading stripper belt in the feed direction. In operation of the device, this assists in the already afore described separation in fractions of different size of root crop so that the rows of stripper elements, positioned one behind the other viewed in feed direction, exhibit an increasingly reduced spacing from each other and a size fractionation can be attempted and at least partially can even be achieved on the sorting belt across the entire width, viewed in its longitudinal direction.

Sorting of the root crop of the mixture to be processed by the device according to the invention is further improved when in longitudinal direction of one of the stripper belts, viewed in its developed state, between two outer stripper elements at least one additional stripper element is arranged that is positioned off-center. In particular, this additional stripper element is arranged closer and farther in the direction of the first row of stripper elements, viewed from the feed direction, in order to be able to impart a first strong initial impulse in operation onto the incoming mixture and to be able to dissolve clumping or agglomerations possibly still existing downstream of a screening stretch. In particular for particularly high-yield regions with correspondingly required high conveying and sorting performance, it can be advantageous when, due to the then higher harvesting and lifting speeds, at least 40% and in particular up to 60% of the width present between the two outer stripper elements is covered by additional stripper elements. The latter can be of different height so that too strong an impulse on small fractions in the supplied mixture can be avoided.

BRIEF DESCRIPTION OF THE DRAWINGS

Further details and advantageous embodiments of the invention result from the following description and the drawings that illustrate several embodiments of the potato harvesting machine provided with a separating device improved in accordance with the invention. The drawing shows in:

FIG. 3 and

DESCRIPTION OF PREFERRED EMBODIMENTS

If useful, elements acting in the same way are provided with identical reference characters. Individual features of the embodiments described in the following, in combination with the features of the independent claims as well as optionally additional claims, can also lead to subject matter in accordance with the invention.

Figure 1:
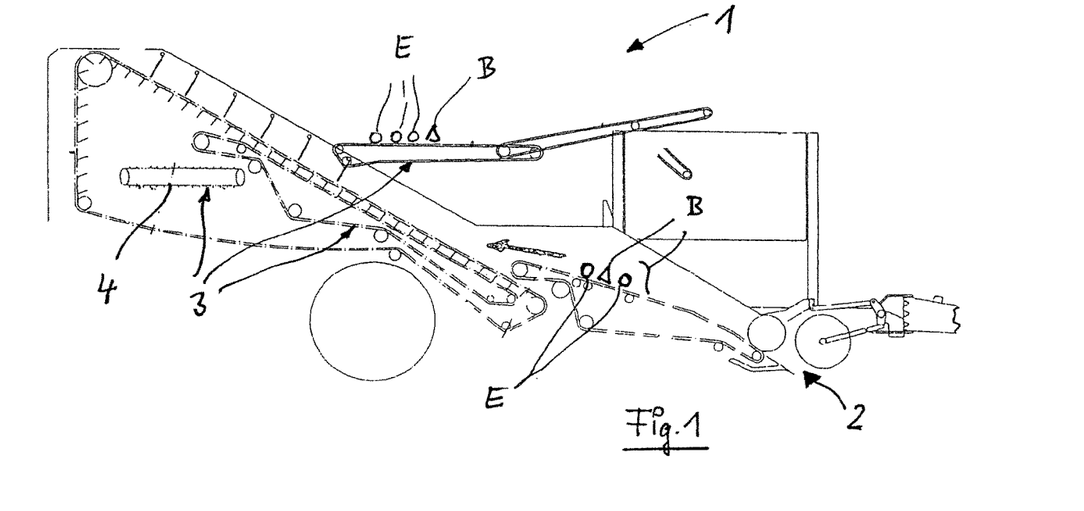
FIG. 1 a schematic illustration of the conveying stretches of a potato harvesting machine according to the prior art.
Figure 2:
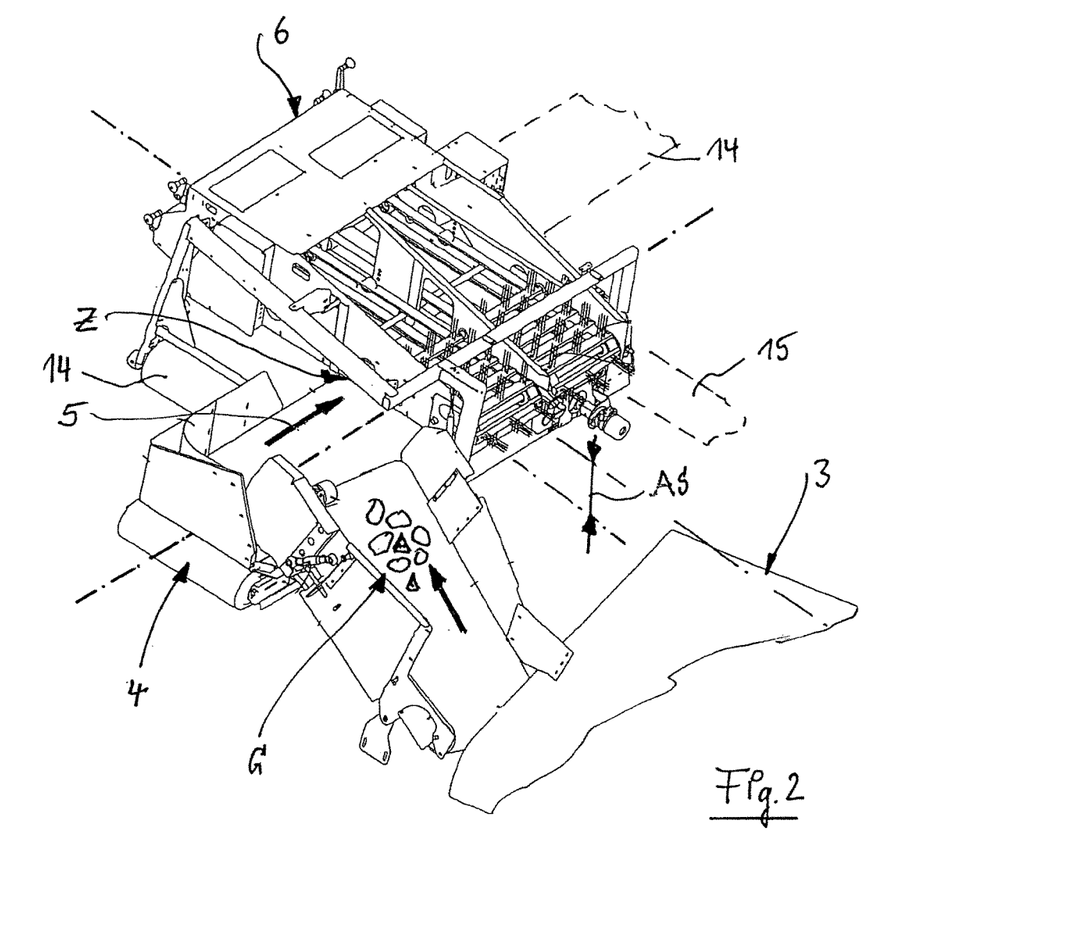
FIG. 2 an enlarged detail illustration of a separating device according to the prior art to be used in the machine according to FIG. 1.

In FIG. 1, a root crop harvester in the form of a potato harvesting machine 1 is illustrated—by a side view—in a schematic illustration. Such potato harvesting machines 1 comprise a leading lifting device 2 from where a mixture G (FIG. 2) comprising the crop E as well as clods, haulm and similar admixtures B is movable into the region of downstream screening belts 3 or similar transport elements. In this context, the mixture G supplied to one of the feed belts 4 in accordance with a feed direction 5 reaches a sorting zone Z (FIG. 2, hidden). In this sorting zone Z, the crop E can be sorted out by means of a separating device 6 arranged above the feed belt 4 and acting transverse to its feed direction 5 on the mixture G.

The known embodiments of these component groups of separating device 6 and feed belt 4 (DE 10 2007 034 446 A1) comprise in this context two stripper belts 8 and 9 circulating in the same direction in a respective stripping direction 7, 7' (FIG. 3) which by means of respective stripping elements 10, 10' as well as 11, 11' engage the crop E. Accordingly, two stripping planes 12 and 13 (FIG. 3) are defined which in feed direction 5 are arranged adjacent to each other or one behind the other. From here, the crop E which has been substantially freed from clods B is supplied to a downstream sorting belt 14 (FIG. 2). In this context, as stripper elements 10, 10' as well as 11, 11', selectively fingers belts (FIG. 9) or brush webs (not illustrated) can be used in order to make a pre-adjustment regarding the ratio of admixtures B and crop E in the mixture G in accordance with the harvesting conditions.

Respective admixtures B which remain as residue on the feed belt 4, in particular in the form of rocks and clods, are supplied, preferably in a guiding direction 5' (FIG. 6) displaced relative to the stripping direction 7 by 90°, to a lateral discharge conveyor 15. The two stripper belts 8, 9 comprise in this context a common support structure T as a support device so that, based on a position (FIG. 3) forming a working gap AS, a common adjustment is possible such that in lifting direction 16 a variation of the working gap AS is possible (FIG. 4).

Figure 3:
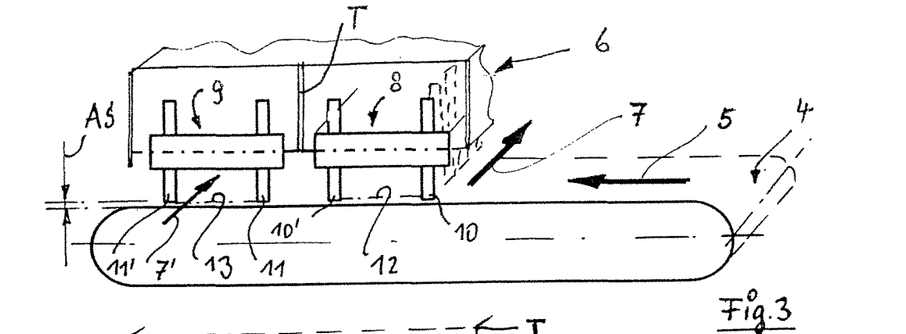
Figure 4:
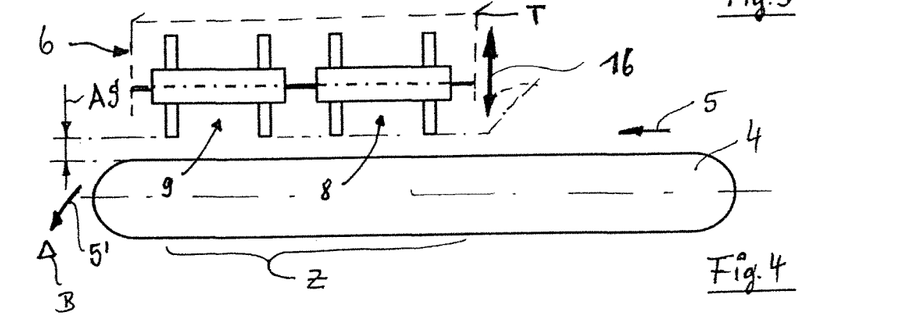
FIG. 4 respective schematic illustrations of the separating device according to FIG. 2 with the adjusting possibilities according to the prior art.

Based on the embodiment illustrated in FIG. 2 to FIG. 4 of the prior art—with simultaneously displaceable and height-adjustable stripper belts 8, 9 (direction of arrow 16, FIG. 4)—the concept according to the invention provides that the separating device 6 now comprises a construction in which the two stripper belts 8', 9' are individually adjustable (FIG. 5 to FIG. 8, schematic illustrations) in the region of at least one support device holding them, respectively.

The concept according to the invention with the individual adjustment of component groups provides that the stripper elements 10, 10' and 11, 11' of the respective stripper belt 8', 9' by means of respective adjusting connectors acting individually in the direction of arrow 16' and 16" are displaceable into substantially variable "vertical" spacings VA and VA' (FIG. 5) relative to the feed belt 4. Also, it is provided that the angular positions indicated generally by WA and WA' can be varied by corresponding individual adjustments of the stripper belts 8', 9' (FIG. 6). In this way, it is apparent that the two stripper belts 8', 9' relative to the feed belt 4—in the region of the sorting zone C—can comprise positions that are each individually adjustable and continuously variable.

The stripper belts 8', 9' define, corresponding to their adjustment in the region of the sorting zone Z, a respective working gap AS with variable dimensions and/or contours (FIG. 5 to FIG. 8) so that the mixture G is exposed to different sorting loads. The latter are in particular adaptable to the field-specific harvesting conditions.

Figure 6:
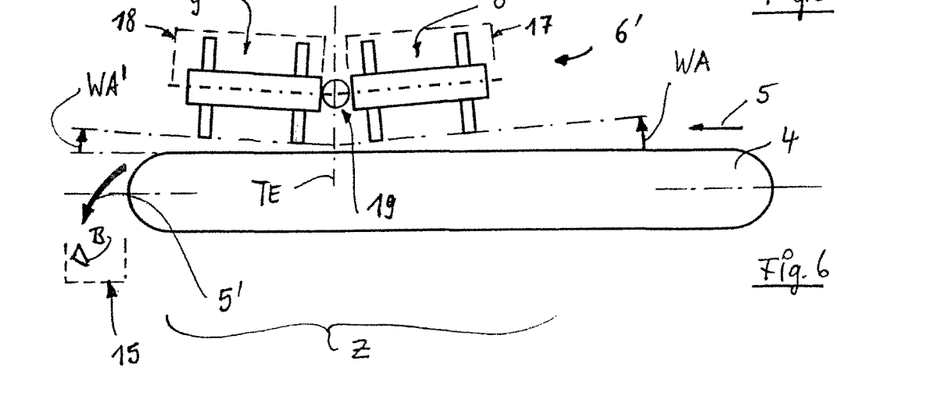
FIG. 6 a schematic illustration similar to FIG. 5 with the two stripper belts in a position tilted in the same direction.
Figure 7:
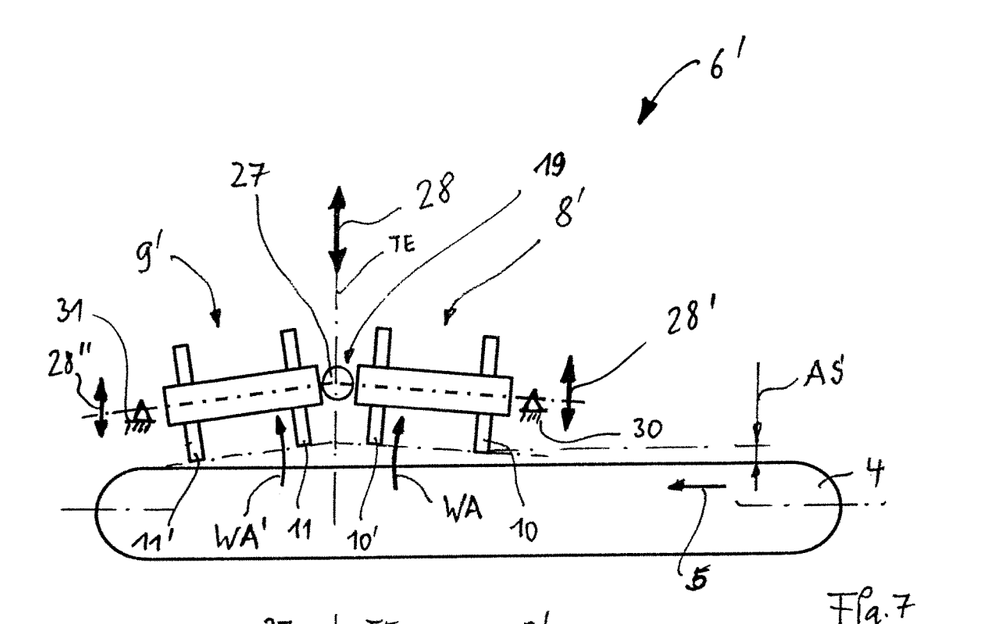
FIG. 7 a schematic illustration similar to FIG. 6 with the stripper belts in a position tilted outwardly in the same direction.
Figure 8:
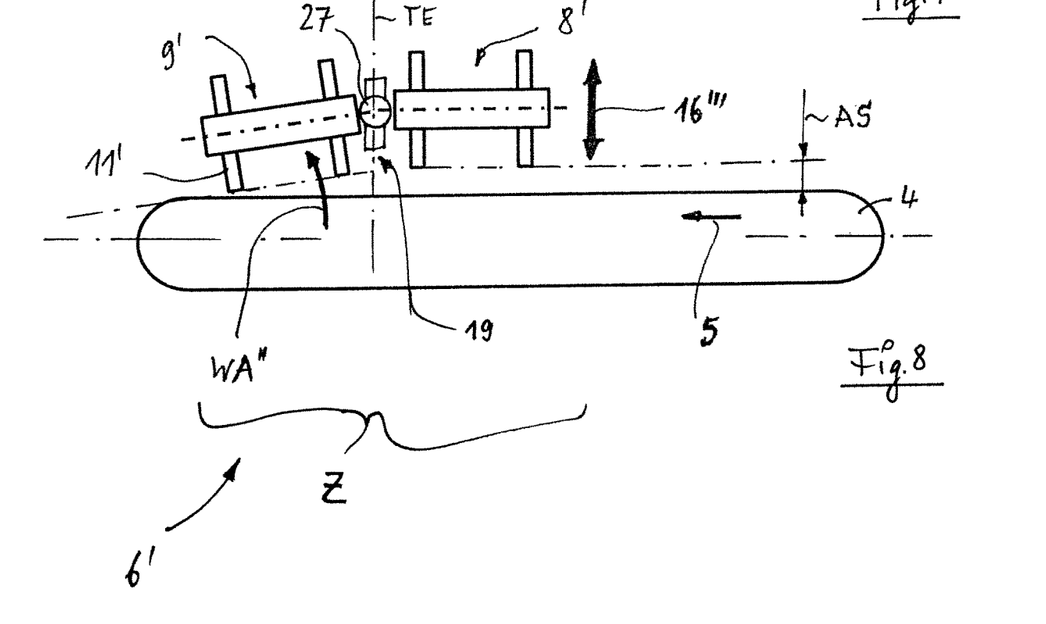
FIG. 8 a schematic illustration similar to FIG. 5 with a tilted stripper belt and a height-displaced stripper belt.

Based on the illustrations according to FIG. 6 and FIG. 7, it is apparent that the respective stripper planes 12', 13' of the stripper belts 8', 9' in their respective transverse direction are adjustable to changeable tilting angles in accordance with the arrows WA and WA'. The constructive configuration of the adjusting connectors can be realized such that the stripper belts 8', 9' can be pivoted in the same direction clockwise or counterclockwise (FIG. 6, FIG. 7). Likewise, it is conceivable to realize a system with opposite pivoting direction (similar: FIG. 8, pivoting according to arrow WA", stroke 16'").

Figure 5:
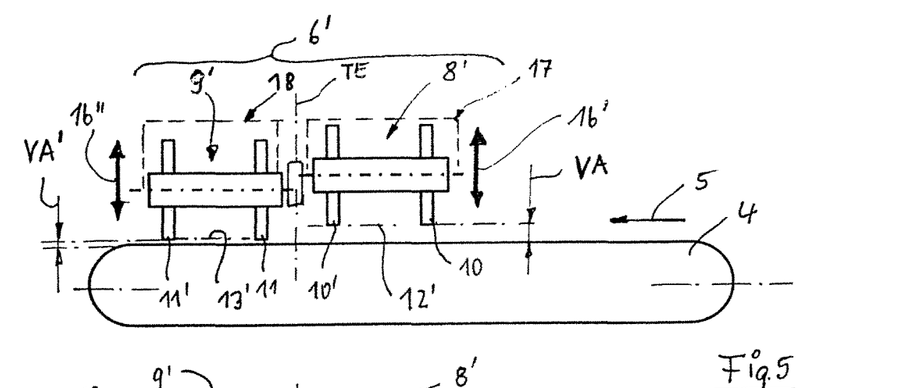
FIG. 5 a schematic illustration similar to FIG. 4 with the separating device according to the invention and its individual adjusting possibilities in the region of the two stripper belts.

Based on the illustration according to FIG. 5, it is apparent that the stripper planes 12', 13' of the two stripper belts 8', 9' each individually are adjusted in their parallel spacing relative to the correlated feed belt 4 (spacings VA and VA'). A combined tilting and lifting adjustment is shown in FIG. 8 wherein the stripper belt 8' is displaced in lifting direction 16'" and the stripper belt 9' is pivoted in a tilting direction WA" such that the previously enlarged working gap is made smaller by the outwardly positioned stripper elements 11'. This also makes clear that the contour of the working gap AS provided for the mixture G has different structures, respectively. A stepped configuration is shown in FIG. 5; tapering and widening embodiments are shown in FIG. 6; an "inner" shaped arc is provided in the embodiment according to FIG. 7; and also the variant with continuously increasing constriction according to FIG. 8 is conceivable with variable dimensions of the working gap AS.

In the illustrated embodiments, it is respectively provided that the two stripper belts 8', 9' comprise each two rows of circulating stripper elements 10, 10' and 11, 11', wherein these two rows in the respective adjustments of the working gap AS (FIG. 5 to FIG. 8) are to be displaced together, respectively. Conceivable is also an expansion of the concept according to the invention wherein also variable embodiments of length and number of stripper elements and/or their respective individual adjustment is conceivable (not illustrated).

When looking jointly at the illustrations according to FIG. 6 to FIG. 8, it is apparent that the two stripper belts 8', 9' for their simultaneous adjustment comprise a central support connection 19. In this context, the two support devices 17, 18 are connected in the region of a dividing plane TE.

Figure 9:
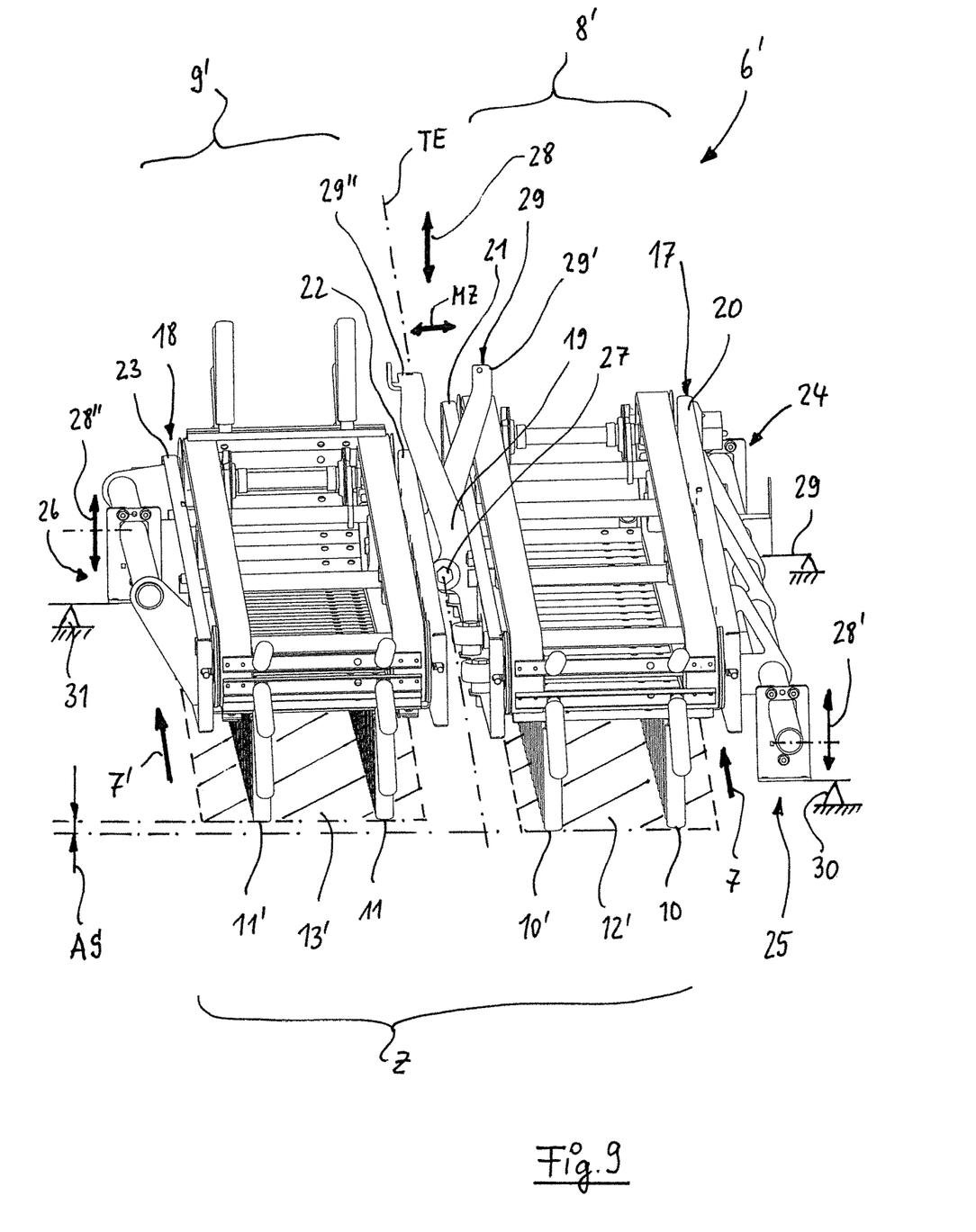
FIG. 9 a constructive embodiment of the separating device according to the principle of FIG. 5.
Figure 10:
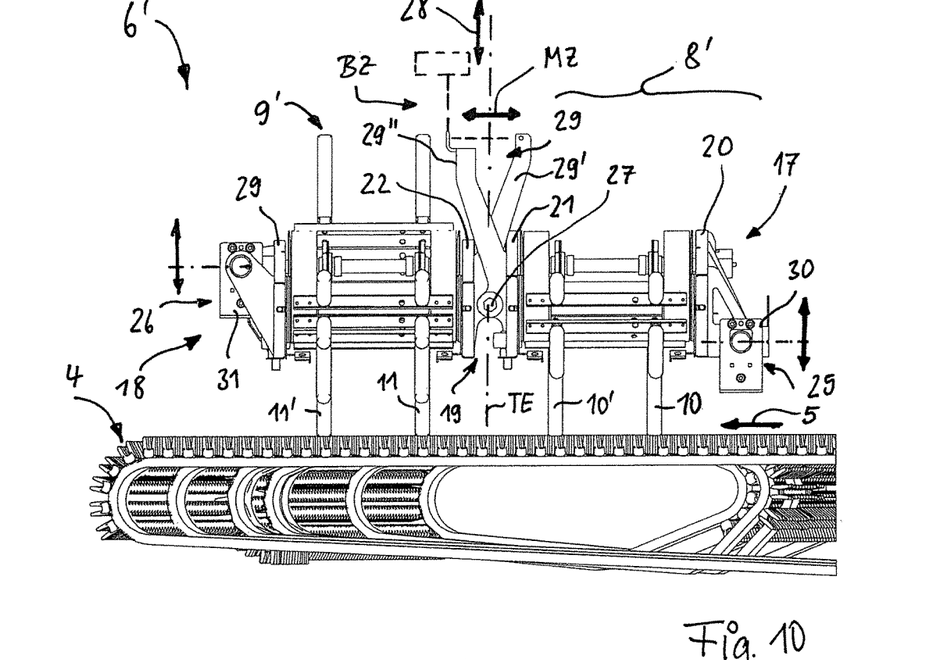
FIG. 10 a front view of the separating device in mounted position above the feed belt similar to FIG. 9.
Figure 11:
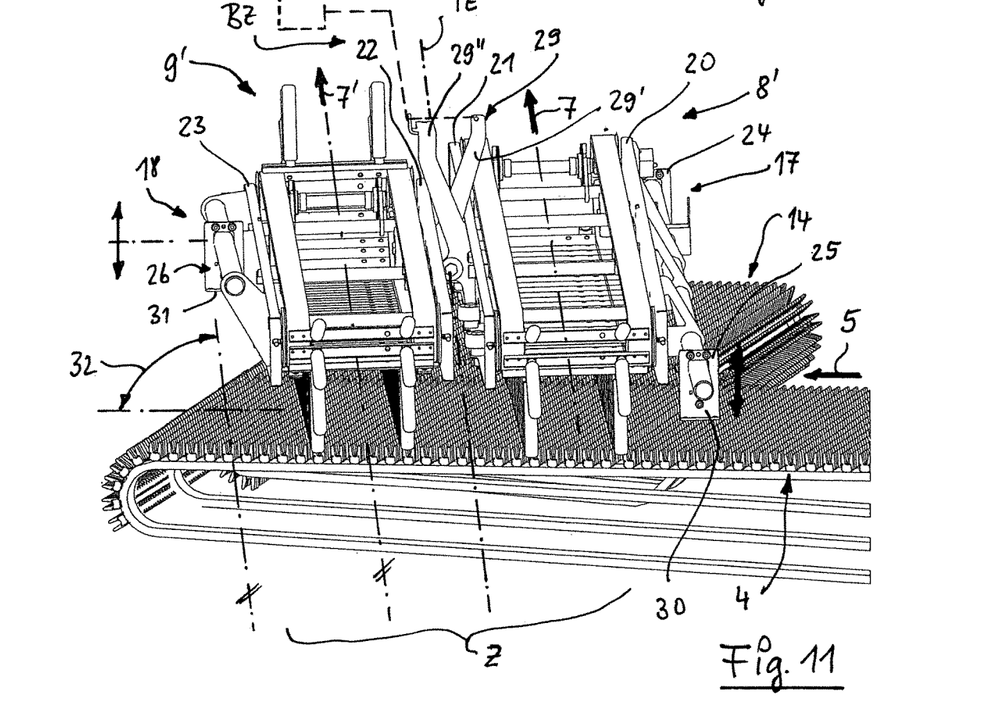
FIG. 11 a perspective view of the sorting zone with separating device provided above the feed belt in slanted position.

When looking jointly at the schematic illustrations according to FIG. 5 to FIG. 8 with the constructive detail embodiments according to FIG. 9 to FIG. 11, it is apparent that the two stripper belts 8', 9' each comprise as a support device 17, 18 a support frame which is provided with lateral plates 20, 21 and 22, 23. It is provided in this context that the neighboring lateral plates 21 and 22 form at least said one support connection 19. This support construction can be completed in that at least one support connection with adjusting device 24, 25, 26 is provided at the two outer lateral plates 20 and 23, respectively.

In this way, a construction is provided in which the two stripper belts 8', 9' in the region of the central support connection 19 can be guided for each adjusting movement and, at the same time, the afore described individual adjustments of the stripper belts 8', 9' by means of the outer adjusting devices 24, 25, 26 can be controlled selectively.

Based on the illustrations, it is apparent that the stripper belts 8', 9' in the region of the central support connection 19 can be interacting in particular by means of a pivot joint 27. This pivot joint—illustrated in the embodiment according to the schematic illustration FIG. 7—can be displaced in a lifting direction 28 so that the simultaneous displacement illustrated in FIG. 7 of the two stripper belts 8', 9' in pivot direction WA, WA' is achieved. For a restoring movement into the start position (FIG. 10)—preferably extending parallel to the feed belt 4—a mechanism 29, not illustrated in detail, for example, with a restoring spring, can be provided in the region of the pivot joint 27. Independent of the adjusting devices provided for the lifting movement 28, a substantially automatic restoring movement of the component groups into the start position is also conceivable in this way.

The lifting movement 28 is controlled in this context in the region of the mechanism 29 whose arms 29' and 29", connected in a cross shape in the pivot joint 27, are connectable to an adjusting component group BZ (FIG. 10). By a pulling movement MZ, the movement component according to the lifting direction 28 is triggered. At the same time, a height adjustment according to arrow 28', 28" (FIG. 7) in the region of the stationary support connectors 30, 31 can be controlled so that the tilted positions of the two stripper belts 8', 9', indicated by the pivot directions WA, WA', can be reached continuously.

In FIG. 9, a conceivable embodiment of the system according to the invention is illustrated with constructive details. In this context, it becomes apparent that the separating device 6' can be preferably provided with only three support connections 29, 30, 31 in the region of the adjusting devices 24, 25, 26. In this way, an advantageous three-point support relative to the machine frame, not shown in detail, of the harvesting machine 1 is provided. It comprises a sufficiently torsion-stiff system in the sorting zone 7 so that a quick displacement of the sorting components is possible with comparatively few adjusting component groups.

In FIG. 10 and FIG. 11, the system is illustrated similar to FIG. 9 wherein here the "crossing position" of feed belt 4 and stripper planes 12', 13' becomes apparent. In FIG. 11 a slanted plan view of the components shows that the separating device 6' is oriented in a position (angle 32) slanted at an acute angle above the feed belt 4. Conceivable are also further variants, not illustrated in detail, of this mounted position of the separating device 6'.

Figure 12:
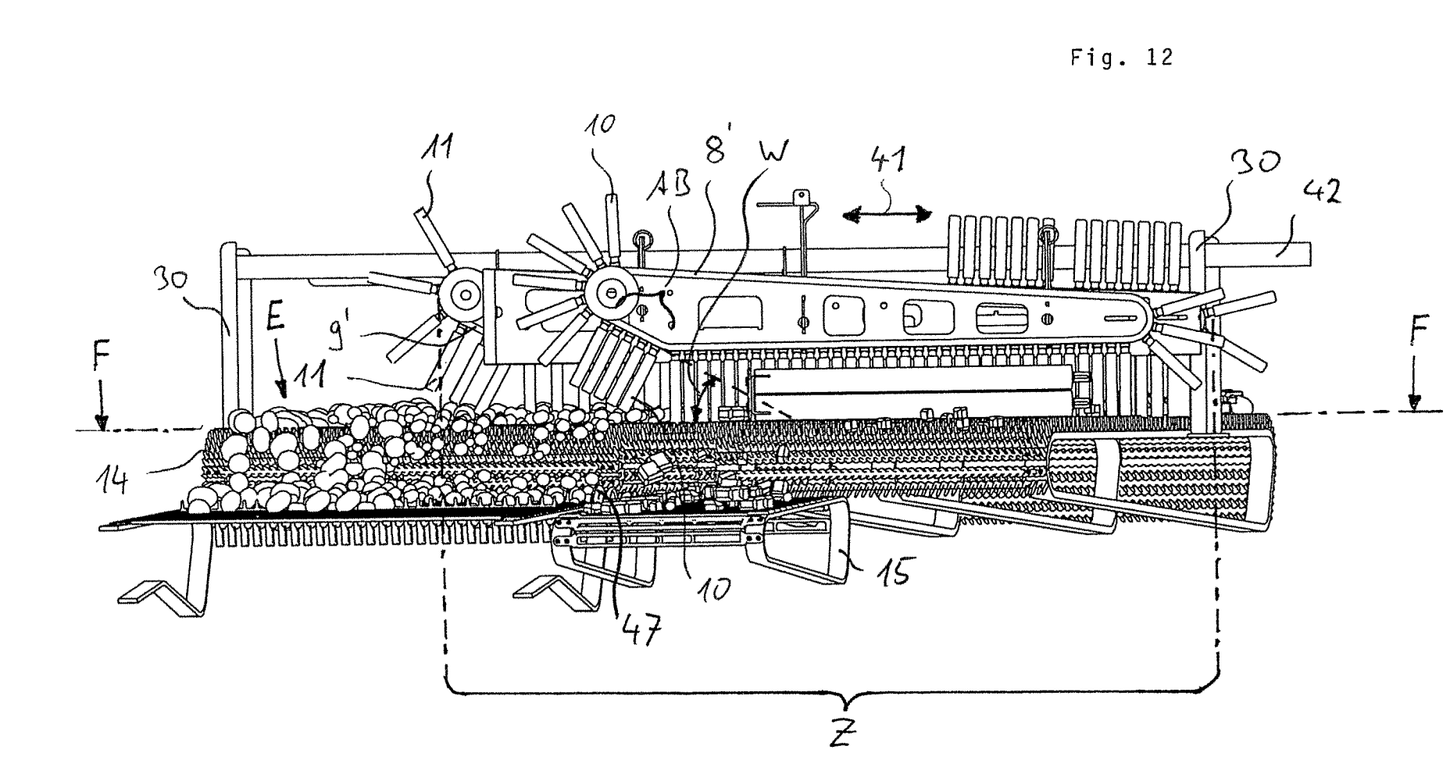
FIG. 12 a side view of a part of a further device according to the invention.

A further solution according to the invention in accordance with FIG. 12 discloses stripper belts 8' and 9' whose stripper elements 10, 11 (as well as 10' and 11', not illustrated) are shown only partly. The illustrated objects of the embodiments according to the invention, like those in the afore described FIGS. 5 to 11 and following FIGS. 13 to 16, are in general part of a potato harvesting machine generally shown in FIG. 1.

Above the sorting zone Z, the stripper belts 8' and 9' extend in the shown illustration according to FIG. 12 initially parallel to a uniform conveying plane F which, according to the invention, is formed by the respective conveying planes defined by the tips of the carrying elements of the feed belt 4 as well as of the sorting belt 14. Perpendicular to the stripping direction 7 there is no height difference between the respective conveying plates. By means of the further adjacently positioned arrangement of the belts and elimination of drop stages, sorting is embodied more gentle and more operationally reliable. Both stripper belts 8' and 9' comprise toward their respective end discharge sections AB angled relative to the parallel extension of the belt. In these sections AB, the stripper belt 8' or stripper belt 9', after an initial deflection, is provided with a constant incline such that the stripper elements 10, 11 in operation gradually and continuously are removed from the goods to be sorted without this leading, due to the deflection, to too strong an impulse in the direction of the side of the downstream sorting belt 14.

The incline of the stripper belts in the respective discharge section results from the illustrated angle W between the contour of the pulling element of the stripper belt 8' or 9' and the stripper planes 12', 13' that presently are coinciding with the conveying plane 7.

Similar to the preceding embodiments according to the invention, the embodiment according to FIG. 12 comprises stationary support connectors 30 which, for example, are attached to a machine frame, not illustrated. At these support elements, guide rods 42 moveable in the direction of the double arrow 41 are supported by means of which the stripper belts 8' and 9' can be displaced in accordance with the directions 41, indicated by the double arrow.

Figure 13:
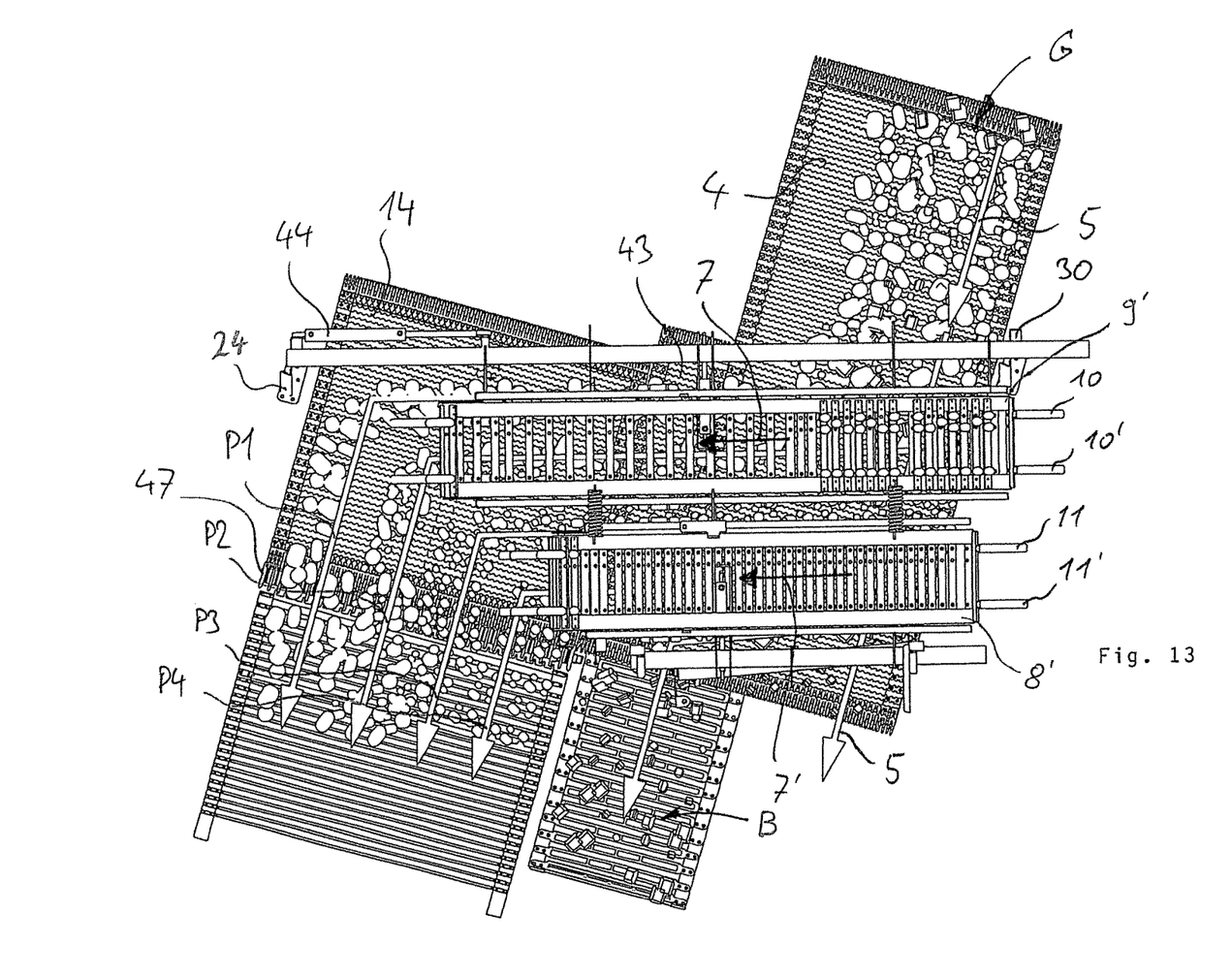
FIG. 13 the object of FIG. 12 in a plan view.
Figure 14:
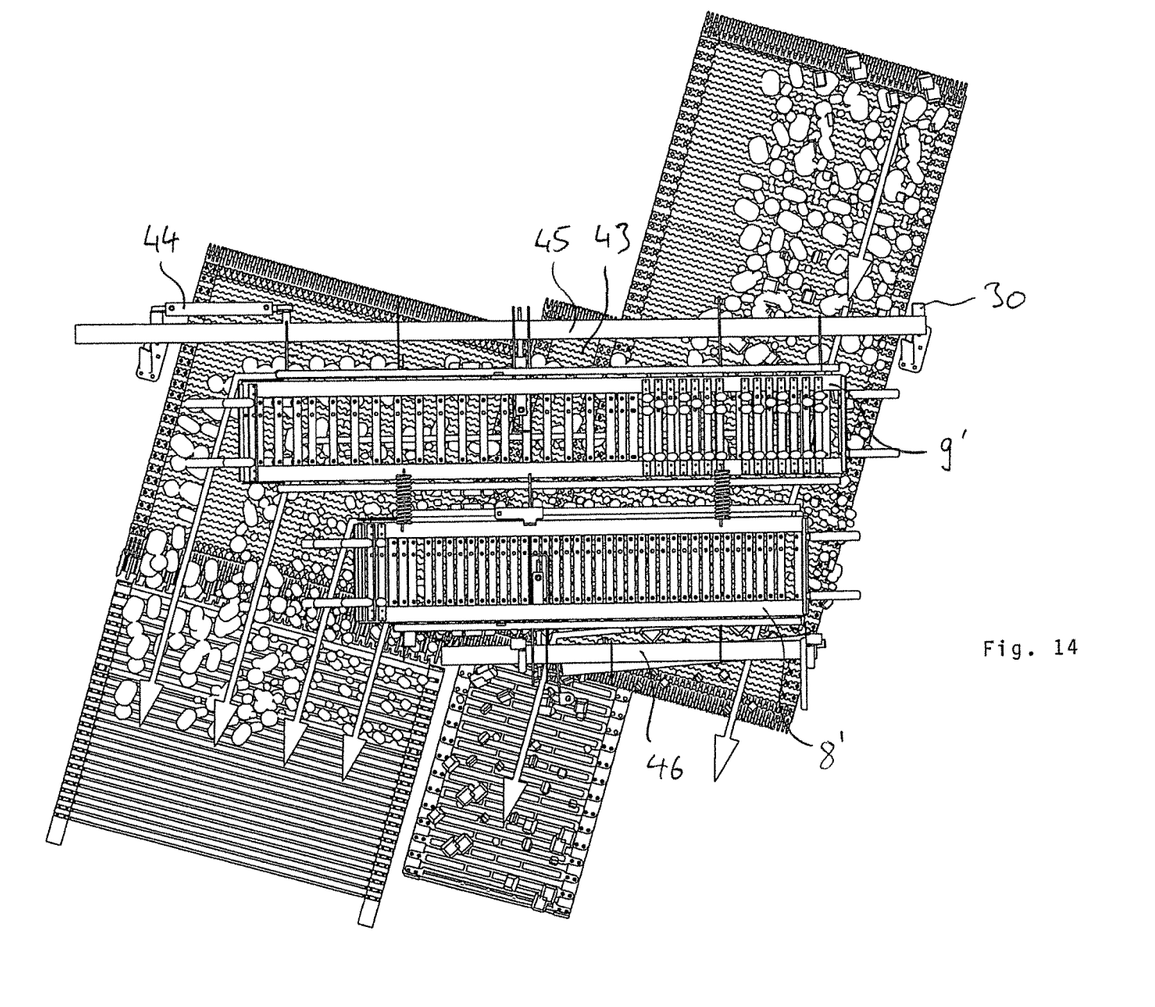
FIG. 14 the object of FIG. 13 in a further operating position.
Figure 15:
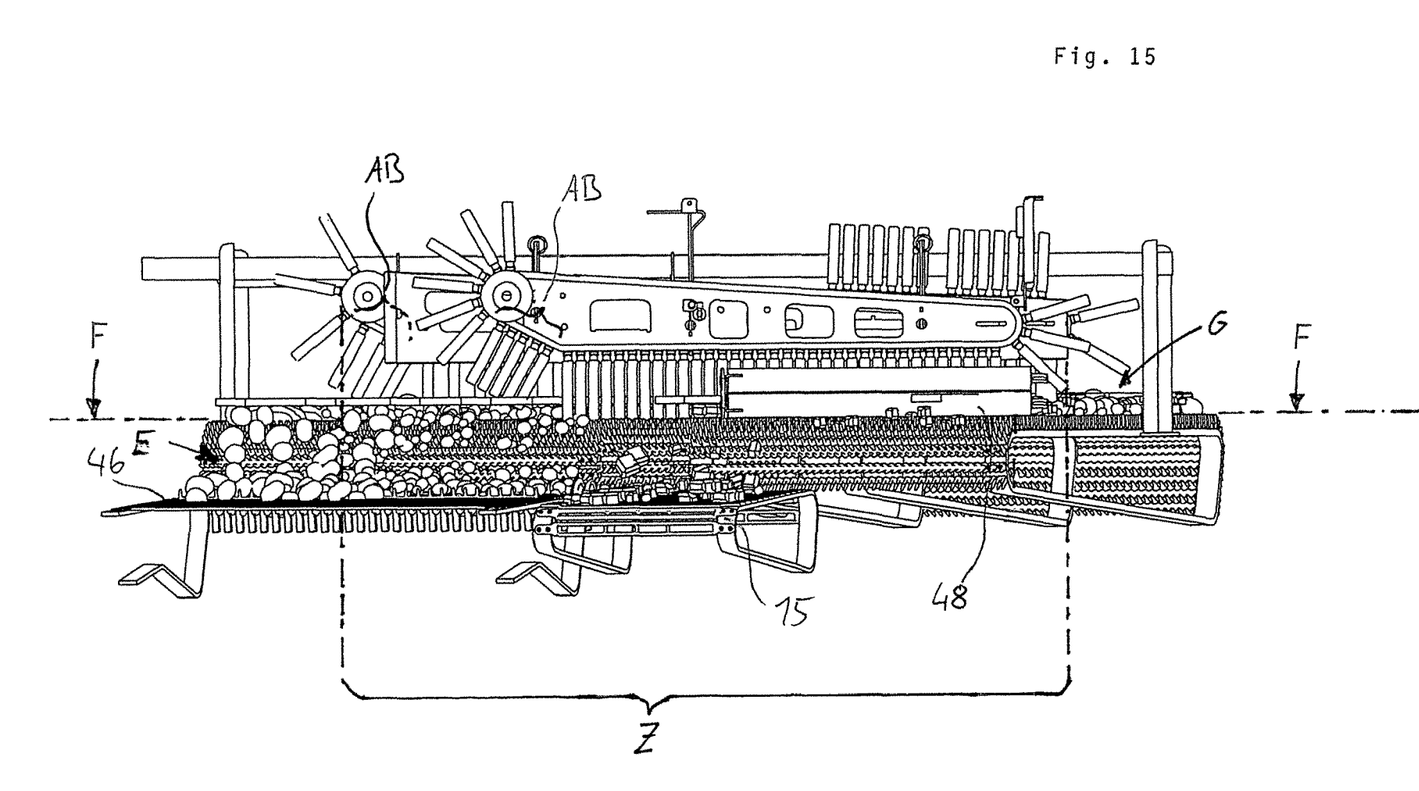
FIG. 15 the object of FIG. 14 in the view according to FIG. 12.

The stripper belts 8' and 9' are of different length, wherein the stripper belt 8 with correlated frame elements is arranged displaced parallel relative to the stripper belt 9 in such a way that, in case of a non-rectangular arrangement of the support device or of the stripper belts relative to the feed belt, the respective stripper elements 10, 10', 11, and 11' in operation of the potato harvesting machine according to the invention both begin to act approximately at the level of the rim of the feed belt 4, respectively (FIG. 13). Moreover, in combination with FIG. 12, it can be seen that the spacing of stripper elements 10, 10' and 11, 11' that are positioned one behind the other in the stripping direction 7 or 7' is different wherein, viewed in the feed direction 5, the spacings of the leading stripper elements 10 is greater than that of the stripper elements 11. Moreover, viewed in the same direction 5, the spacings and heights of the stripper elements 10, 10', 11, 11' across the conveying plane are designed such, be it due to the length of the different fingers or due to the adjustability and slanted position of the respective stripper belts 8', 9', that the fractionation illustrated on the sorting belt 14 can result. Arrows P1, P2, P3, and P4 show the corresponding sorting curves based on in particular different sorting parameters, comprising angular position WR and WR', length and spacing of the stripper elements 10, 10', 11, 11' as well as positioning of the stripper belts 8' and 9' relative to their longitudinal direction.

For a particularly good sorting of the mixture G, the deflection of the root crop is carried out at an angle >90° between the directions 5 and 7 or 7' so that the sorting zone Z can be extended. The sorting zone Z assumes a correspondingly large surface area wherein it may be advantageous to provide an additional intermediate conveyor belt 43 which can be embodied as a conventional hedgehog web or rubber knob web and comprises an analog conveying speed and direction relative to the feed belt.

For the purpose of further adaptation to different sorting parameters, the entire support device that carries the stripper belts 8' and 9' can be designed in a further embodiment, not illustrated, so as to be pivotable about a vertical axis which is projecting from the illustration plane of FIG. 13. In this case, the stationary support connector 30 would be preferably secured on a pivot frame. A length adjusting device 44 that is secured on the adjusting device 24, which is also at least partially stationarily secured, can effect a displacement of the stripper belts with correlated support pipes 45 and 46 of the support device. In this way, the stripper belts 8' and 9' can be moved from the working position illustrated in FIG. 13 into the further working position illustrated in FIG. 14 in order to take into account different harvesting conditions, changing size class distributions, and other sorting parameters. Moreover, the root crop harvester which in the working position according to FIG. 13 possibly surpasses a permissible road width, can be reduced again to a permissible road width by positioning the separating device in the position illustrated in FIG. 14.

The intermediate conveyor belt 43 as well as the feed belt 4 and the sorting belt 14 have parallel conveying directions relative to each other. Moreover, viewed in a side view according to FIG. 15 as well as FIG. 12, it can be seen that these three belts form a common uniform conveying plane F through the sorting zone without drop stage. Moreover, the planes which are formed by the respective upper ends of the carrying elements of feed belt, intermediate conveyor belt, and sorting belt pass directly into each other. Possible intermediate spaces between the belts are negligible for the material to be transported. Even though in operation potatoes or the crop is transferred from the sorting belt 14 onto a somewhat lower extending picking table belt 46 by means of a transfer roller 47, the crop is however substantially not conveyed by free fall in this context but at a slant and actively conveyed away so that also a drop stage-free transport of the crop to the picking table is realized. Alternatively, the sorting belt 14 could also be embodied to be longer all the way to the picking table, not illustrated. By means of a root crop harvester embodied according to the invention, sorting is realized in a particularly gentle and operationally reliable way.

A lateral discharge conveyor 15 is provided for discharging admixtures B of the mixture G that are feedable in a targeted fashion by transverse conveying rollers 48.

Figure 16:
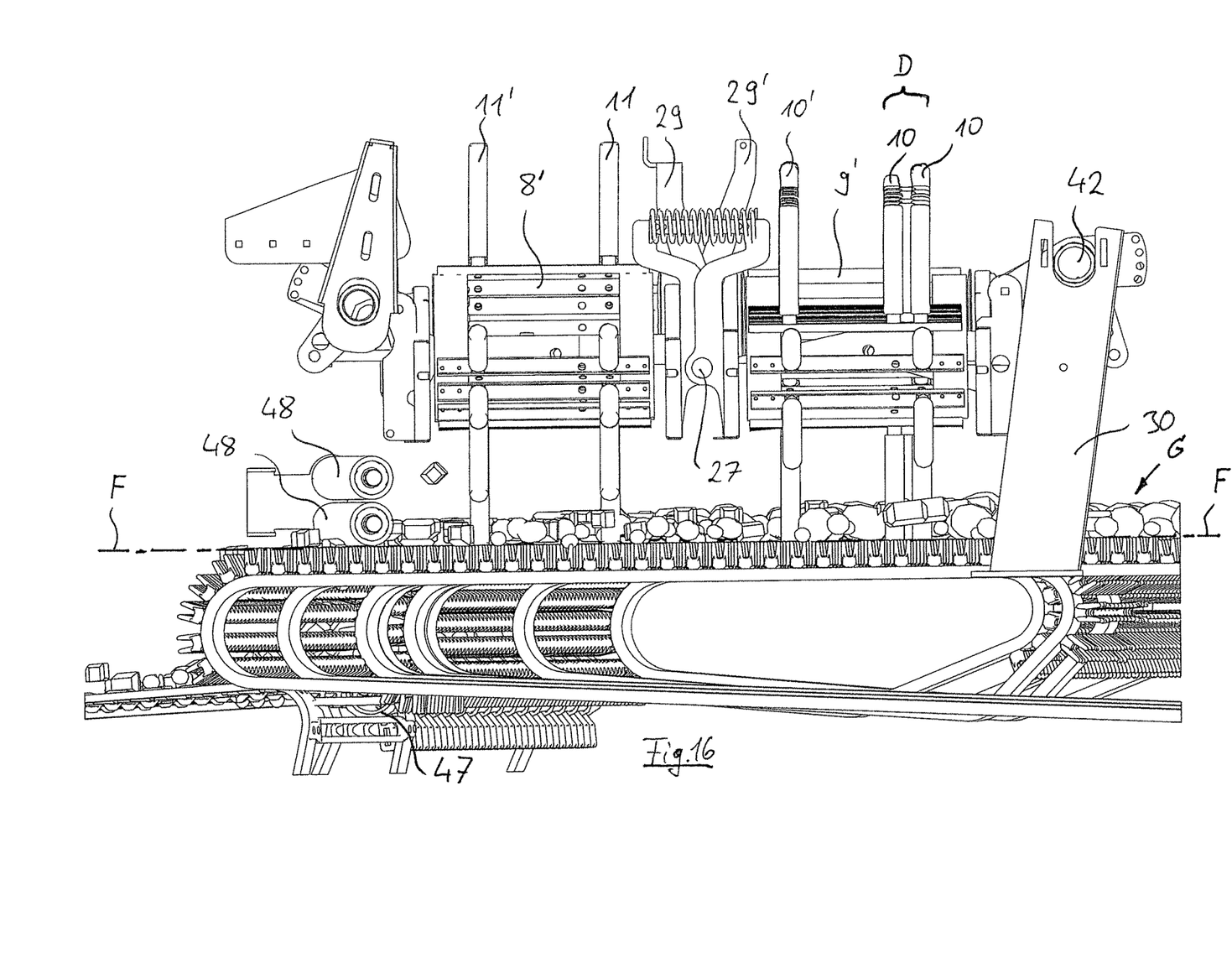
FIG. 16 a view in stripping direction of a part of an object according to the invention.

These rollers 48 are also illustrated in FIG. 16 in a view in direction of the stripping directions 7 or 7' similar to FIGS. 5 to 7. While the stripper belt 8' in the viewing direction comprises only two adjacently extending rows of stripper elements 11 to 11', the leading stripper belt 9' in feed direction 5 is provided first with a double row D of closely adjacently positioned stripper elements 10, which however in longitudinal direction of the conveying belt are displaced relative to each other, as well as a further row of stripper elements 10'. The stripper elements 10 of a double row D have moreover a different length in order to be able to act also at different levels optimally on the incoming admixtures B and crop components of the mixture G.

Regardless of the illustrations in FIGS. 12 to 16 in which the stripper planes and the conveying plane F are parallel to each other, by the already explained arms 29 and 29' that are connected to each other by means of the pivot joint 27, relative positions of the stripper belt 8' and 9' can be adjusted in order to react during operation, without changing stripper elements or individual stripper belts, to varying mixtures and sorting conditions. For example, in case of greatly varying sizes, the stripper belt 9' that is first in feed direction 5 can be angled somewhat in order to enlarge in operation the spacing of the stripper elements 10 relative to the conveying plane compared to the downstream stripper elements.

Due to the off-center arrangement of the two stripper elements 10 of the double row, it is in particular possible to generate an impulse dissolving accumulations present on the feed belt 4.

What is claimed is:

1. A root crop harvester, embodied as a potato harvesting machine, comprising:
    a lifting device picking up a mixture comprising crop and admixtures;
    screening belts arranged downstream of the lifting device and configured to transport the mixture away from the lifting device;

the screening belts including at least one feed belt configured to feed in a feed direction the mixture to a sorting zone;

a separating device arranged in the sorting zone above the at least one feed belt;

a sorting belt arranged downstream of the separating device configured to move in a moving direction parallel to the feed direction;

an intermediate conveyor belt arranged between the at least one feed belt and the sorting belt to enlarge the sorting zone, the intermediate conveyor belt configured to move in a moving direction parallel to the feed direction;

the separating device comprising a first stripper belt and a second stripper belt both circulating in an identical stripping direction and each comprising respective stripper elements, wherein the stripper elements act on the crop in a direction transverse to the feed direction and supply the crop in two adjacently arranged stripper planes of the first and second stripper belts to the sorting belt, wherein the admixtures remain on the feed belt and are discharged in a guiding direction which is angled relative to the stripping direction;

wherein the first stripper belt has a first length and the second stripper belt has a second length, wherein the first length is shorter than the second length;

wherein the first stripper belt is arranged behind the second stripper belt in the feed direction, wherein the first stripper belt extends from the at least one feed belt across the intermediate conveyor belt and across the sorting belt and ends above the sorting belt;

wherein the second stripper belt extends from the at least one feed belt across the intermediate conveyor belt and across the sorting belt and ends above the sorting belt, wherein the second stripper belt extends past the first stripper belt, viewed in the stripping direction;

wherein the stripper elements of the first stripper belt have a first spacing relative to each other and the stripper elements of the second stripper belt have a second spacing relative to each other in the stripping direction, respectively, wherein the first spacing is smaller than the second spacing;

wherein a supply of the crop from the at least one feed belt to the sorting belt is embodied without drop stage.

2. The root crop harvester according to claim 1, wherein a supply of the crop from the sorting belt to a picking table arranged downstream is embodied without drop stage.

3. The root crop harvester according to claim 1, wherein the sorting belt and the at least one feed belt form conveying planes passing into each other to form a uniform conveying plane.

4. The root crop harvester according to claim 1, wherein a height difference between a conveying plane of the sorting belt and a conveying plane of the at least one feed belt in a direction perpendicular to the stripping direction, viewed in a side view, amounts to less than 3 cm.

5. The root crop harvester according to claim 1, wherein at least one of the first and second stripper belts, in the stripping direction upstream of a deflection of said at least one of the first and second stripper belts, comprises a discharge section with a constant incline smaller than 55° relative to the stripper plane of said at least one of the first and second stripper belts such that said at least one of the first and second stripper belts comprises an angled contour upstream of the deflection, viewed in a direction transverse to the stripping direction.

6. The root crop harvester according to claim 5, wherein across a length of the discharge section a spacing of the stripper elements of said at least of the first and second stripper belts relative to the stripper plane increases to maximally 50% of a length of the stripper elements.

7. The root crop harvester according to claim 5, wherein the incline of the discharge section is adjustable.

8. The root crop harvester according to claim 1, wherein the first and second stripper belts are pivotable about an identical vertical axis.

9. The root crop harvester according to claim 1, wherein the first and second stripper belts each are pivotable about a respective vertical axis.

10. The root crop harvester according to claim 1, further comprising a support device supporting the first and second stripper belts, wherein the support device is pivotable about a vertical axis.

11. The root crop harvester according to claim 1, wherein the first and second stripper belts are positioned relative to the at least one feed belt at an angle between 80° and 145°.

12. The root crop harvester according to claim 1, wherein at least one of the first and second stripper belts is moveable in a longitudinal direction in the stripping direction or opposite to the stripping direction.

13. The root crop harvester according to claim 1, wherein a length of the stripper elements of the first stripper belt differs.

14. The root crop harvester according to claim 1, wherein a length of the stripper elements of the second stripper belt differs.

15. The root crop harvester according to claim 1, wherein the stripper elements of at least one of the first and the second stripper belts are arranged in two outwardly positioned rows in a longitudinal direction of the at least one of the first and second stripper belts, wherein, across at least a portion of the at least one of the first and second stripper belts in the longitudinal direction, additional stripper elements are provided, wherein the additional stripper elements each are arranged off-center between the two outwardly positioned rows of the at least one of the first and second stripper belts.

* * * * *